(12) United States Patent
Zhang et al.

(10) Patent No.: US 9,047,174 B2
(45) Date of Patent: Jun. 2, 2015

(54) METHOD AND SYSTEM FOR HIERARCHICALLY MANAGING STORAGE RESOURCES

(75) Inventors: Wei Zhang, Shenzhen (CN); Feng Wang, Shenzhen (CN); Haiying Ju, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 332 days.

(21) Appl. No.: 13/520,355

(22) PCT Filed: Nov. 26, 2010

(86) PCT No.: PCT/CN2010/079194
§ 371 (c)(1),
(2), (4) Date: Jul. 3, 2012

(87) PCT Pub. No.: WO2011/116612
PCT Pub. Date: Sep. 29, 2011

(65) Prior Publication Data
US 2012/0278547 A1 Nov. 1, 2012

(30) Foreign Application Priority Data
Mar. 23, 2010 (CN) .......................... 2010 1 0140581

(51) Int. Cl.
*G06F 12/02* (2006.01)
(52) U.S. Cl.
CPC .................................... *G06F 12/023* (2013.01)
(58) Field of Classification Search
CPC ............ G06F 3/067; G06F 2211/1028; G06F 17/30091; G06F 17/30194; G06F 3/0683; G06F 11/1448; G06F 3/0643; G06F 8/65; G06F 12/0804; G06F 17/30138; G06F 3/0608
See application file for complete search history.

(56) References Cited

U.S. PATENT DOCUMENTS

| | | | | |
|---|---|---|---|---|
| 6,427,195 | B1 * | 7/2002 | McGowen et al. | ........... 711/153 |
| 2006/0010290 | A1 * | 1/2006 | Sasamoto | ..................... 711/114 |
| 2007/0124531 | A1 | 5/2007 | Nishihara | |
| 2009/0049240 | A1 * | 2/2009 | Oe et al. | ........................ 711/114 |

(Continued)

FOREIGN PATENT DOCUMENTS

| | | |
|---|---|---|
| CN | 1405683 A | 3/2003 |
| CN | 1963814 A | 5/2007 |
| CN | 1973334 A | 5/2007 |

(Continued)

OTHER PUBLICATIONS

International Search Report in international application No. PCT/CN2010/079194, mailed on Mar. 3, 2011.

(Continued)

*Primary Examiner* — Cheng-Yuan Tseng
*Assistant Examiner* — Candice Rankin
(74) *Attorney, Agent, or Firm* — Oppedahl Patent Law Firm LLC

(57) ABSTRACT

The disclosure discloses a method for hierarchically managing storage resources, which comprises: planning a storage space, establishing an address management index, and storing or reading data according to the index and a type of the data. The disclosure further discloses a system for hierarchically managing storage resources. Through the method and system of the disclosure, space can be better saved, storage requirements of data of different sizes can be met, and the storage space can be flexibly recorded and released.

8 Claims, 1 Drawing Sheet

(56) References Cited

U.S. PATENT DOCUMENTS

2009/0216988 A1    8/2009  Palladino
2011/0099351 A1*  4/2011  Condict ........................ 711/216

FOREIGN PATENT DOCUMENTS

| | | |
|---|---|---|
| CN | 101799788 A | 8/2010 |
| JP | H03253952 A | 11/1991 |
| JP | H0698361 A | 4/1994 |
| JP | 2009087189 A | 4/2009 |
| WO | 0215018 A1 | 2/2002 |

OTHER PUBLICATIONS

English Translation of the Written Opinion of the International Search Authority in international application No. PCT/CN2010/079194, mailed on Mar. 3, 2011.

Supplementary European Search Report in European application No. 10848274.6, mailed on Jul. 16, 2014. (5 pages—see entire document).

* cited by examiner

US 9,047,174 B2

METHOD AND SYSTEM FOR HIERARCHICALLY MANAGING STORAGE RESOURCES

TECHNICAL FIELD

The disclosure relates to the management technology of storage resources, particularly to a method and system for hierarchically managing storage resources.

BACKGROUND

In a digital logic design, storage of a mass of data is often involved, such as a service of High Speed Uplink Packet Access (HSUPA) of Wideband Code Division Multiple Access (WCDMA), however, hardware storage is less flexible than software storage, and storage chips in such design are expensive. For some designs with huge data storage, if each segment of data is stored in the maximum space, although such design is simple, a storage resource waste is great.

In the current storage management, the storage is mainly managed by software through operating systems, which is totally different from the data storage mechanisms in the digital logic design, so that the software management is not adapted to the digital logic design.

SUMMARY

In view of this, the main objective of the disclosure is to provide a method and system for hierarchically managing storage resources, which can better save a storage space and meet storage requirements of data of different sizes.

To achieve the objective above, the technical solution of the disclosure is realized as follows.

The disclosure provides a method for hierarchically managing storage resources, which comprises:

planning a storage space, establishing an address management index, and storing or reading data according to the index and a type of the data.

In the solution above, the step of planning the storage space may comprise: dividing the storage space into multiple slices of different sizes, wherein a size of each of the slices is smaller than that of its next slice; and dividing each of the slices into multiple segments, wherein the segments in a same slice have a same size.

In the solution above, the step of establishing the address management index may comprise: selecting two Random Access Memories (RAMs), recording, by using one of the RAMs, a storage status flag of data from a data sender, a slice number and a segment number associated with the stored data, and recording, by using another one of the RAMs, storage status flags of all of the segments in all of the slices.

In the solution above, for regularly-updated data, the step of storing data according to the index and the type of the data may comprise:

determining a slice number of a slice in which the data are to be stored according to the size of the data, and querying the storage status flag of the data from the data sender;

when the data from the data sender are not stored, finding out a first segment in which no data is stored, and storing the data in the found segment; and when the data from the data sender have been stored, querying the slice number of the slice in which the data from the data sender have been stored, comparing the queried slice number with the determined slice number of the slice in which the data are to be stored, when the queried slice number is same as the determined the slice number, storing received data in the queried location in which the data from the data sender have been stored; and when the queried slice number is not same as the determined the slice number, storing the data as when the data from the data sender are not stored.

In the solution above, for irregularly-updated data, the step of storing data according to the index and the type of the data may comprise:

determining a slice number of a slice in which the data are to be stored according to the size of the data, and querying the storage status flag of the data from the data sender;

when the data from the data sender are not stored, finding out a first one of segments in which no data is stored, and storing the data in the found segment; and when the data from the data sender have been stored, finding out a first one of segments in which no data is stored according to the determined slice number of the slice in which the data are to be stored, and storing the data in the found segment.

In the solution above, for the irregularly-updated data, the step of reading data according to the index and the type of the data may comprise:

searching an address management index RAM for a storage location of the data according to an identifier of the data sender of the data to be read, reading the data according to the storage location of the data, clearing the slice number and the segment numbers for recording the storage location in the RAM of the data, and modifying a segment storage status flag in another address management index RAM for indentifying the storage status of the data to an unset bit.

The disclosure further provides a system for hierarchically managing storage resources, which comprises:

an address planning unit, configured to plan a storage space of a memory;

an address index unit, configured to establish an address management index for the planned storage space;

a data storing and processing unit, configured to store data according to the index established by the address index unit and a type of the data; and a data reading and processing unit, configured to read the data according to the index established by the address index unit and the type of the data, and to update the address management index in the address index unit after reading the data.

Consequently, it can be seen that, by the method and system of the disclosure, storage requirements of data of different sizes can be met by dividing the storage space differently and allocating storage spaces of different sizes as required; moreover, the storage space can be flexibly released by recording the storage status of the storage space in real time, thereby better saving the storage space and avoiding wasting storage resources.

DETAILED DESCRIPTION

The basic idea of the disclosure is: planning an address of a storage space, establishing an address management index, and storing data according to the index and a type of the received data.

The data are divided into regularly-updated data and irregularly-updated data, wherein the regularly-updated data refer to that data stored to a storage space will be read in a regular time, so that the storage space will be released and can be reused, and new data can be written to overwrite the previous data; and the irregularly-updated data refer to that data stored to a storage space will be read in an irregular time, so that the storage space cannot be reused until the data are read, and new data cannot be written to overwrite the previous data.

Figure 1:
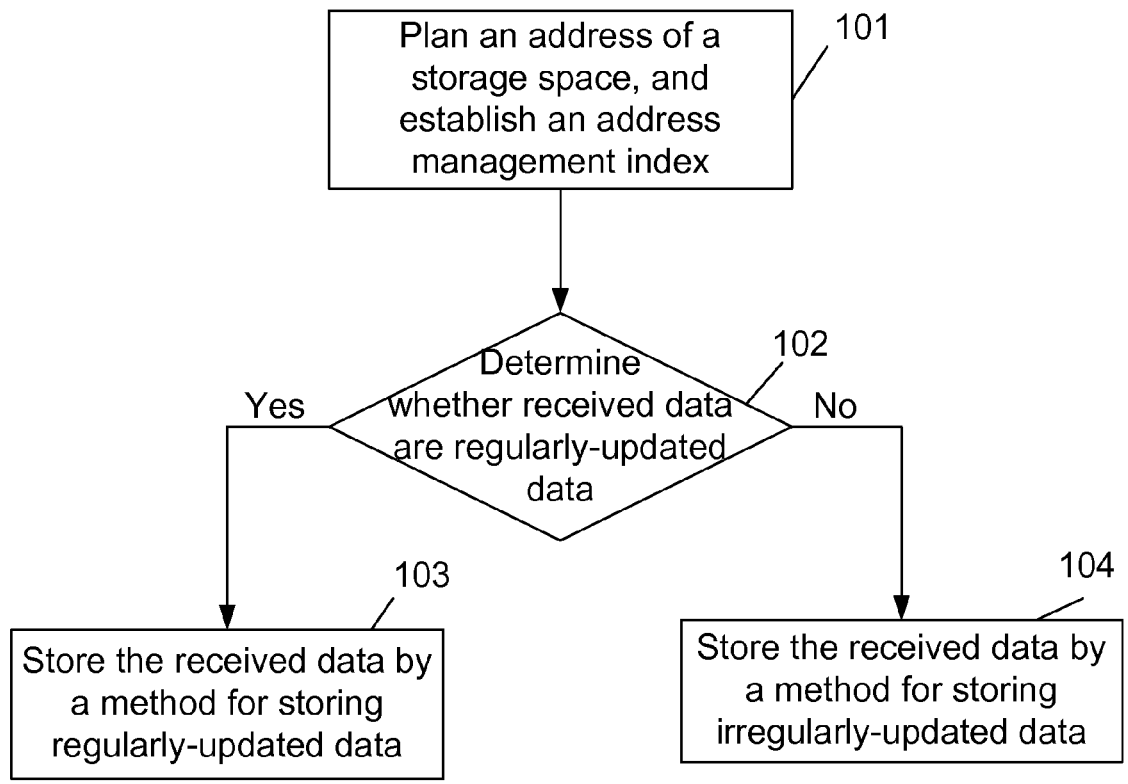
FIG. 1 is a flowchart of a method for hierarchically managing storage resources of the disclosure.

The disclosure will be described below in detail with reference to specific embodiments and drawings; as shown in FIG. 1, a method for hierarchically managing storage resources of the disclosure comprises the following steps.

Step 101: planning an address of a storage space, and establishing an address management index.

The step of planning the address specifically comprises: dividing the storage space for storing data into n slices of different sizes which are identified by a slice number dis_num; wherein dis_1 identifies the first slice, dis_n identifies the $n^{th}$ slice, the size of each of the slices is smaller than that of its next slice, and can be flexibly configured according to requirements of the design; dividing each slice into m segments which are identified by a segment number seg_n_m; wherein seg_1_1 identifies the first segment of the first slice, the segments in a same slice have a same size, different storage spaces are allocated according to a data sender identifier user_id, and the number of the storage spaces allocated to each data sender is determined manually.

The step of establishing the address management index specifically comprises: selecting two Random Access Memories (RAMs), and marking one RAM with RAM_assign which is configured to record a storage status flag, represented as assign_en, of data from the data sender; wherein assign_en indicates that data are not stored when it is not set (i.e., the value is 0), and indicates that data have been stored when it is set (i.e., the value is 1); and the RAM is also configured to record the storage location of the data, i.e., the slice number dis_num, and the segment number seg_n_m; and marking the other RAM with RAM_seg_en which is configured to record storage status flags, represented as seg_assign_en, of all segments in all slices; wherein seg_assign_en indicates that data have been stored when it is set (i.e., the value is 1), and indicates that data are not stored when it is not be set (i.e., the value is 0).

Step 102: determining whether received data are regularly-updated data; if yes, executing step 103; otherwise, executing step 104.

There are two application scenarios in the disclosure: the storage of regularly-updated data or irregularly-updated data. Generally, before receiving data, a system will know whether currently received data are regularly-updated data or irregularly-updated data.

Step 103: storing the received data by a method for storing regularly-updated data, and ending the processing flow.

Herein, the method for storing regularly-updated data comprises: determining the slice number dis_num to be stored according to the size of the received data which contain the data sender identifier user_id, and querying assign_en corresponding to user_id in RAM_assign according to user_id.

If assign_en is 0, it is indicated that data of user_id are not stored, RAM_seg_en is indexed according to the slice number dis_num of a slice in which the data are to be stored, so as to find out the first segment in which no data is stored (i.e., the value is 0) in corresponding segments of the slice number of the slice in which the data are to be stored, write the data in the segment, set the segment number of the slice in RAM_seg_en and assign_en corresponding to user_id in RAM_assign to 1 respectively, and record the storage location of the data by dis_num and seg_n_m; for example, if the data are stored in the third segment of the second slice, then dis_num is dis_2, and seg_n_m is seg_2_3.

If assign_en is 1, it is indicated that data of user_id have been stored, dis_num storing data of user_id in RAM_assign is queried to compare whether the determined dis_num is the same as the queried dis_num; if yes, the received data are stored in the queried storage location of the data of user_id according to the records in RAM_assign to overwrite original data;

otherwise, the data are stored by a method for data of user_id which are not stored, and queried dis_num and corresponding seg_n_m in RAM_assign and the storage status flag of original data in RAM_seg_en are modified to be not set respectively.

Step 104: storing the received data by a method for storing irregularly-updated data.

Herein, the method for storing irregularly-updated data comprises: determining the slice number dis_num according to the size of the received data, and querying assign_en corresponding to user_id in RAM_assign according to user_id.

If assign_en is 0, it is indicated that data of user_id are not stored, RAM_seg_en is indexed according to the slice number dis_num of the slice in which the data are to be stored, so as to find out the first segment in which no data is stored in seg_n_m corresponding to dis_num, write the data in the segment, set the segment of the slice number in RAM_seg_en and assign_en in RAM_assign respectively, and record the storage location of the data by dis_num and seg_n_m.

If assign_en is 1, RAM_seg_en is indexed according to the slice number of the slice in which the data are to be stored, so as to find out the first segment in which no data is stored in corresponding segments of the slice number, store the data in the segment, set the segment of the slice number in RAM_seg_en, add assign_en1 to user_id in RAM_assign and set it to 1, and record the slice and segment numbers assigning the storage location of the data.

When the data is read and the address management index is updated, if data are regularly-updated data, the location of the data in RAM_assign can be indexed according to user_id of the data to be read, i.e., the slice and segment numbers where the data are located, to read the data directly according to the corresponding location.

If data are irregularly-updated data, the location of the data in RAM_assign can be indexed according to user_id of the data, so as to read the data according to the location of the data, clear the slice and segment numbers corresponding to user_id in RAM_assign, and modify the segment number in RAM_seg_en to an unset bit, i.e., the value is 0.

Figure 2:
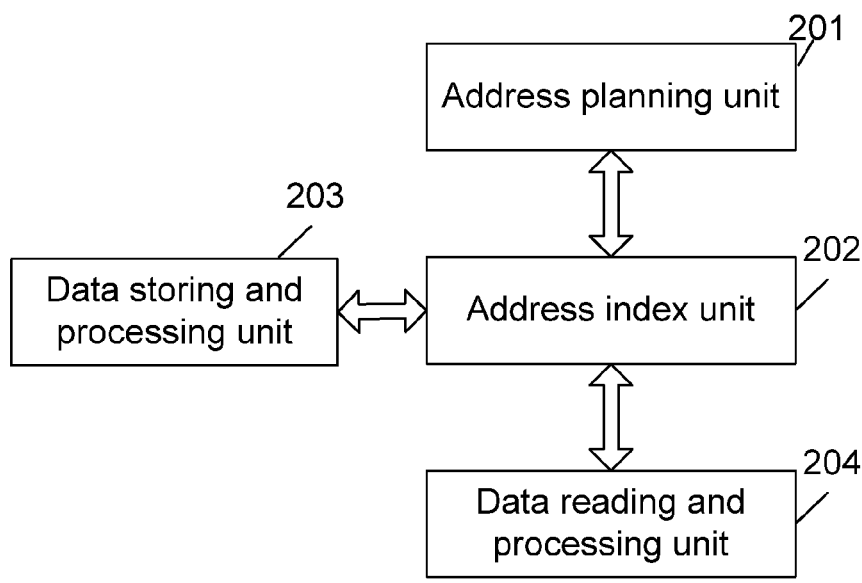
FIG. 2 is a diagram of the composition of a system for hierarchically managing storage resources of the disclosure.

The disclosure further provides a system for hierarchically managing storage resources, as shown in FIG. 2, it comprises: an address planning unit 201, an address index unit 202, a data storing and processing unit 203, and a data reading and processing unit 204.

Wherein the address planning unit 201 is configured to planning a storage space of a memory;

the address index unit 202 is configured to establish an address management index for the planned storage space, and record a storage status of the storage space;

the data storing and processing unit 203 is configured to store data according to the index established by the address index unit 202 and a type of the data; and the data reading and processing unit 204 is configured to read the data according to an address index in the address index unit 202, and to update the address index in the address index unit 202.

The address planning unit 201 is specifically configured to divide the storage space into n slices of different sizes which are identified by a slice number dis_num; the size of each of the slices is smaller than that of its next slice and can be flexibly configured according to requirements of the design; each slice is divided into m segments which are identified by a segment number seg_n_m, and the segments in a same slice have a same size.

The address index unit 202 is specifically configured to select two RAMs, and mark one RAM with RAM_assign which is configured to record a storage status flag, represented as assign_en, of data from a data sender; assign_en indicates that data are not stored when it is not set (i.e., the value is 0), and indicates that data have been stored when it is set (i.e., the value is 1); the storage location of the data is recorded, i.e., the slice number dis_num, and the segment number seg_n_m and the address index unit 202 is further specifically configured to mark the other RAM with RAM_seg_en which is configured to record storage status flags, represented as seg_assign_en, of all segments in all slices; seg_assign_en indicates that data have been stored when it is set (i.e., the value is 1), and indicates that data are not stored when it is not be set (i.e., the value is 0).

The data storing and processing unit 203 is specifically configured, for regularly-updated data, to determine the slice number of the slice in which the data are to be stored, which comprises: querying assign_en corresponding to user_id in RAM_assign of the address index unit 202 according to user_id of the data sender contained in received data; if the data are not stored (i.e., assign_en is 0), indexing RAM_seg_en according to the slice number dis_num of the slice in which the data are to be stored to find out the first segment in which no data is stored (i.e., the value is 0) in corresponding segments of the slice number, writing the data in the segment, setting the storage status flag of the segment in RAM_seg_en and assign_en in RAM_assign of the address index unit 202 respectively, and recording the storage location of the data i.e., assigning the storage location of the data by dis_num and seg_n_m; and if the data have been stored (i.e., assign_en is 1), querying the slice number storing data of user_id in RAM_assign of the address index unit 202 according to user_id in the received data, comparing whether the slice number of the slice in which the data are to be stored is the same as the queried slice number; if yes, still storing the data in the queried storage location of the data of user_id according to the records in RAM_assign, and overwriting original data; otherwise, storing the data by a method for data of user_id which are not stored, modifying queried assign_en of user_id in RAM_assign to an unset bit, clearing the slice and segment numbers for recording the storage location of the data, and modifying the storage status flag of the segment in which original data is stored in RAM_seg_en of the address index unit 202 to an unset bit.

The data storing and processing unit 203 is specifically configured, for irregularly-updated data, to determine the slice number of the slice in which the data are to be stored according to the size of the received data, query assign_en corresponding to user_id in RAM_assign of the address index unit 202 according to user_id; if the data are not stored (i.e., assign_en is 0), indexing RAM_seg_en of the address index unit 202 according to the slice number of the slice in which the data are to be stored to find the first segment in which no data is stored in the slice number, store the data in the segment, set the storage status flag of the segment in RAM_seg_en and the value of assign_en in RAM_assign respectively, and record the storage location of the data; if the data have been stored (i.e., assign_en is 1), indexing RAM_seg_en according to the slice number of the slice in which the data are to be stored to find out the first segment in which no data is stored in the slice number, store the data in the segment, set the storage status flag of the segment in RAM_seg_en, add assign_en1 to user_id in RAM_assign and set it, and record and assign the storage location of the data.

The data reading and processing unit 204 is specifically configured, for regularly-updated data, to query the storage location of the data in RAM_assign of the address index unit 202 according to user_id of the data to be read, and read the data directly according to the queried location.

The data reading and processing unit 204 is specifically configured, for irregularly-updated data, to index the storage location of the data in RAM_assign according to user_id of the data to be read, read the data according to the storage location of the data, clear the slice and segment numbers for recording the storage location of the data corresponding to user_id in RAM_assign, and modify a segment storage status flag in RAM_seg_en for identifying the storage status of the data to an unset bit.

The above are only the preferred embodiments of the disclosure and not intended to limit the scope of protection of the disclosure, and any modifications, equivalent replacements, improvements and the like within the spirit and principle of the disclosure shall fall within the scope of protection of the disclosure.

What is claimed is:

1. A method for hierarchically managing storage resources, comprising:
   planning a storage space,
   establishing an address management index, and storing or reading data according to the index and a type of the data,
   wherein the step of planning the storage space comprises: dividing a storage space into multiple slices of different sizes, wherein a size of each of the slices is smaller than that of its next slice; and dividing each of the slices into multiple segments, wherein the segments in a same slice have a same size;
   wherein the step of establishing the address management index comprises:
   selecting two Random Access Memories (RAMs), recording, by using one of the RAMs, a storage status flag of data from a data sender, a slice number and a segment number associated with the stored data, and recording, by using another one of the RAMs, storage status flags of all of the segments in all of the slices; and
   wherein the type of the data comprises: regularly-updated data and irregular-updated data; the regularly-updated data refers to that data stored to a storage space will be read in a regular time, so that the storage space will be released and can be reused, and new data can be written to overwrite the previous data; and the irregularly-updated data refers to that data stored to a storage space will be read in an irregular time, so that the storage space cannot be reused until the data are read, and new data cannot be written to overwrite the previous data.

2. The method according to claim 1, wherein, for regularly-updated data, the step of storing data according to the index and the type of the data comprises:
   determining a slice number of a slice in which the data are to be stored according to the size of the data, and querying the storage status flag of the data from the data sender;

when the data from the data sender are not stored, finding out a first segment in which no data is stored, and storing the data in the found segment; and when the data from the data sender have been stored, querying the slice number of the slice in which the data from the data sender have been stored, comparing the queried slice number with the determined slice number of the slice in which the data are to be stored, when the queried slice number is same as the determined the slice number, storing received data in the queried location in which the data from the data sender have been stored; and when the queried slice number is not same as the determined the slice number, storing the data as when the data from the data sender are not stored.

3. The method according to claim 1, wherein, for irregularly-updated data, the step of storing data according to the index and the type of the data comprises:

determining a slice number of a slice in which the data are to be stored according to the size of the data, and querying the storage status flag of the data from the data sender;

when the data from the data sender are not stored, finding out a first one of segments in which no data is stored, and storing the data in the found segment; and when the data from the data sender have been stored, finding out a first one of segments in which no data is stored according to the determined slice number of the slice in which the data are to be stored, and storing the data in the found segment.

4. The method according to claim 3, wherein, for the irregularly-updated data, the step of reading data according to the index and the type of the data comprises:

searching an address management index RAM for a storage location of the data according to an identifier of the data sender of the data to be read, reading the data according to the storage location of the data, clearing the slice number and the segment numbers for recording the storage location in the RAM of the data, and modifying a segment storage status flag in another address management index RAM for indentifying the storage status of the data to an unset bit.

5. A system for hierarchically managing storage resources, comprising:

an address planning unit, configured to plan a storage space of a memory;

an address index unit, configured to establish an address management index for the planned storage space;

a data storing and processing unit, configured to store data according to the index established by the address index unit and a type of the data; and a data reading and processing unit, configured to read the data according to the index established by the address index unit and the type of the data, and to update the address management index in the address index unit after reading the data, wherein the address planning unit is specifically configured to divide a storage space into multiple slices of different sizes, wherein a size of each of the slices is smaller than that of its next slice; and to divide each of the slices into multiple segments, wherein the segments in a same slice have a same size;

wherein the address planning unit is specifically configured to select two Random Access Memories (RAMs), to record a storage status flag of data from a data sender, a slice number and a se merit number associate with the stored data by using one of the RAMs, and to record storage; status flags of all of the segments in all of slices by using another one of the RAM;

wherein the type of the data comprises: reqularly-updated data and irregularly-updated data.

6. The system according to claim 5, wherein the data storing and processing unit is specifically configured, for regularly-updated data, to determine a slice number of a slice in which the data are to be stored according to the size of the data, and to query the storage status flag of the data from the data sender; to find out a first one of segments in which no data is stored and store the data in the found segment, when determining that the data from the data sender are not stored; to query the slice number of the slice in which the data from the data sender have been stored and compare the queried slice number with the determined slice number of the slice in which the data are to be stored, when determining that the data from the data sender have been stored; to store received data in the queried location in which the data from the data sender are stored, when the queried slice number is same as the determined the slice number; and to store the data as when the data from the data sender are not stored, when the queried slice number is not same as the determined the slice number.

7. The system according to claim 5, wherein the data storing and processing unit is specifically configured, for irregularly-updated data, to determine a slice number of a slice in which the data are to be stored according to the size of the data, to query the storage status flag of the data from the data sender; to find out a first one of segments in which no data is stored and store the data in the found segment, when determining that the data from the data sender are not stored; to find out a first one of segments in which no data is stored according to the determined slice number of the slice in which the data are to be stored and store the data in the found segment, when determining that the data from the data sender have been stored.

8. The system according to claim 5, wherein the data reading and processing unit is specifically configured, for irregularly-updated data, to search the address index unit for a location of the data according to an identifier of the data sender of the data to be read, to read the data according to the storage location of the data, to clear the slice number and the segment number in the address index unit for recording the storage location of the data, and to modify a segment storage status flag in the address index unit for identifying the storage status of the data to an unset bit.

* * * * *